US006892253B2

United States Patent
Robertson

(10) Patent No.: US 6,892,253 B2
(45) Date of Patent: May 10, 2005

(54) MAINTAINING REMOTE QUEUE USING TWO COUNTERS IN TRANSFER CONTROLLER WITH HUB AND PORTS

(75) Inventor: Iain Robertson, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 352 days.

(21) Appl. No.: 09/932,334

(22) Filed: Aug. 17, 2001

(65) Prior Publication Data

US 2002/0120796 A1 Aug. 29, 2002

(30) Foreign Application Priority Data

Aug. 17, 2000 (EP) .......................................... 00307033

(51) Int. Cl.[7] .............................................. G06F 3/00
(52) U.S. Cl. ............................. 710/52; 710/57; 710/33; 710/34
(58) Field of Search ............................. 710/29, 33, 34, 710/44, 52, 54, 57, 5, 6; 711/167–169

(56) References Cited

U.S. PATENT DOCUMENTS

| | | | |
|---|---|---|---|
| 4,833,651 A | | 5/1989 | Seltzer et al. |
| 5,450,546 A | * | 9/1995 | Krakirian ..................... 710/57 |
| 5,761,735 A | | 6/1998 | Huon et al. |
| 5,832,308 A | * | 11/1998 | Nakamura et al. ............ 710/53 |
| 5,884,101 A | * | 3/1999 | Wu ............................... 710/57 |
| 6,049,842 A | * | 4/2000 | Garrett et al. ................ 710/33 |
| 6,055,285 A | * | 4/2000 | Alston ........................ 375/372 |
| 6,134,610 A | * | 10/2000 | Chung .......................... 710/55 |
| 6,349,372 B1 | * | 2/2002 | Benveniste et al. ......... 711/159 |
| 6,401,149 B1 | * | 6/2002 | Dennin et al. ................ 710/58 |
| 6,504,824 B1 | * | 1/2003 | Tanaka et al. .............. 370/252 |
| 2002/0007428 A1 | * | 1/2002 | Chilton ....................... 710/52 |

FOREIGN PATENT DOCUMENTS

| | | |
|---|---|---|
| EP | 0 013 347 A | 7/1980 |
| EP | 0 132 481 A | 2/1985 |
| EP | 0 484 652 A | 5/1992 |

OTHER PUBLICATIONS

A. Livay, et al., *A Producer–Consumer Synchronization System*, Motorola Technical Developments, US Motorola, Inc., Schaumburg, Illinois, vol. 32, Sept. 1, 1997, pp. 77–78.

* cited by examiner

Primary Examiner—Jeffrey Gaffin
Assistant Examiner—David Martinez
(74) Attorney, Agent, or Firm—Robert D. Marshall, Jr.; W. James Brady, III; Frederick J. Telecky, Jr.

(57) ABSTRACT

The data transfer apparatus and method employs two queue counters to maintain the status of a first-in-first-out buffer memory. A master count (251) indicates the number of entries available for use within the FIFO (410). New data can be allocated to the FIFO only if this master count is non-zero. This master count is decremented (401) upon allocation of new data to the FIFO. A remote count (252) stores the number of data entries stored in the FIFO. This remote count is incremented (413) upon allocation of data to the FIFO and decremented (414) upon reading data from the FIFO. A confirm decrement signal (408) from the remote count triggers an increment of the master count. This two counter technique makes better use of the available bandwidth than the prior art by not requiring a FIFO depth equal the to the data transfer latency. This technique is particularly useful in systems with delays between the data source and data destination and a mismatch of maximum data transfer rates.

11 Claims, 3 Drawing Sheets

MAINTAINING REMOTE QUEUE USING TWO COUNTERS IN TRANSFER CONTROLLER WITH HUB AND PORTS

TECHNICAL FIELD OF THE INVENTION

The technical field of this invention is data transfer in a data processor system.

BACKGROUND OF THE INVENTION

Digital signal processing (DSP) differs significantly from general purpose processing performed by micro-controllers and microprocessors. One key difference is the strict requirement for real time data processing. For example, in a modem application, it is absolutely required that every sample be processed. Even losing a single data point might cause a digital signal processor application to fail. While processing data samples may still take on the model of tasking and block processing common to general purpose processing, the actual data movement within a digital signal processor system must adhere to the strict real-time requirements of the system.

As a consequence, digital signal processor systems are highly reliant on an integrated and efficient direct memory access (DMA) engine. The direct memory access controller is responsible for processing transfer requests from peripherals and the digital signal processor itself in real time. All data movement by the direct memory access must be capable of occurring without central processing unit (CPU) intervention in order to meet the real time requirements of the system. That is, because the CPU may operate in a software tasking model where scheduling of a task is not as tightly controlled as the data streams the tasks operate on require, the direct memory access engine must sustain the burden of meeting all real time data stream requirements in the system.

The early direct memory access has evolved into several successive versions of centralized transfer controllers and more recently into the transfer controller with hub and ports architecture. The transfer controller with hub and ports architecture is described in U.K. Patent Application No. 9901996.9 filed Apr. 10, 1999 entitled TRANSFER CONTROLLER WITH HUB AND PORTS ARCHITECTURE, having a convention application U.S. patent application Ser. No. 09/543,870 filed Apr. 6, 2000.

A first transfer controller module was developed for the TMS320C80 digital signal processor from Texas Instruments. The transfer controller consolidated the direct memory access function of a conventional controller along with the address generation logic required for servicing cache and long distance data transfer, also called direct external access, from four digital signal processors and a single RISC (reduced instruction set computer) processor.

The transfer controller architecture of the TMS320C80 is fundamentally different from a direct memory access in that only a single set of address generation and parameter registers is required. Prior direct memory access units required multiple sets for multiple channels. The single set of registers, however, can be utilized by all direct memory access requesters. Direct memory access requests are posted to the transfer controller via set of encoded inputs at the periphery of the device. Additionally, each of the digital signal processors can submit requests to the transfer controller. The external encoded inputs are called "externally initiated packet transfers" (XPTs). The digital signal processor initiated transfers are referred to as "packet transfers" (PTs). The RISC processor could also submit packet transfer requests to the transfer controller.

The transfer controller with hub and ports introduced several new ideas concepts. The first was uniform pipelining. New digital signal processor devices containing a transfer controller with hub and ports architecture have multiple external ports, all of which look identical to the hub. Thus peripherals and memory may be freely interchanged without affecting the hub. The second new idea is the concept of concurrent execution of transfers. That is, up to N transfers may occur in parallel on the multiple ports of the device, where N is the number of channels in the transfer controller with hub and ports core. Each channel in the transfer controller with hub and ports core is functionally just a set of registers. This set of registers tracks the current source and destination addresses, the word counts and other parameters for the transfer. Each channel is identical, and thus the number of channels supported by the transfer controller with hub and ports is highly scalable.

Finally the transfer controller with hub and ports includes a mechanism for queuing transfers up in a dedicated queue memory. The TMS320C80 transfer controller permitted only was one transfer outstanding per processor at a time. Through the queue memory provided by the transfer controller with hub and ports, processors may issue numerous transfer requests up to the queue memory size before stalling the digital signal processor.

The present invention deals with the data transfer connecting various memory port nodes as applied to the transfer controller with hub and ports, which is the subject of U.K. Patent Application Number 9909196.9 filed Apr. 10, 1999, having a convention U.S. patent application Ser. No. 09/543, 870 filed Apr. 6, 2000. The transfer controller with hub and ports is a significant basic improvement in data transfer techniques in complex digital systems and provides many useful features, one of which is the internal memory port which allows connection of a virtually unlimited number of processor/memory nodes to a centralized transfer controller. The centralized transfer controller must be able to transfer data from node to node with performance relatively independent of how near or remote a node might be from the transfer controller itself. To clarify the problem solved by the present invention, it is helpful to review the characteristics, architecture, and functional building blocks of the transfer controller with hub and ports.

SUMMARY OF THE INVENTION

The present invention provides an efficient means for utilizing a counter to maintain the queue count value at a remote location on the output end of a multi-stage pipeline. The preferred embodiment in this application is a transfer controller device with hub and ports architecture. The master counter resides at the initial stage of a pipeline of six stages or more. The remote queue counter is located at the output end of the pipeline.

When signals are sent from the C-pipeline final stage in the hub to the ports location a whole clock cycle is allowed. Similarly a whole clock cycle is allowed when signals are sent from the port to the hub initial Q-pipeline stage. Typically such a pipeline has a depth of about six stages.

For each pipeline (either source or destination) the capability exists to initiate one transaction per cycle. To make maximum use of the available cycles, it is desirable to be able to initiate transactions with the same port on multiple consecutive cycles.

In order to initiate a transaction with a particular port, there has to be space available in the command queue of that port. Consider what would happen if there were only one counter recording the state of that queue, and that it resided in the port (where the queue is). In the simplest form, this is what would happen:

The decision would be made in the P-stage to send a command to the port in question. Three cycles later, the command would be sent to the C stage (assuming no annulment). On the next cycle, the port would adjust the value of queue counter. Then on the next cycle, the queue counter status would be sent back to the hub.

When the port has processed an entry from its queue, it sends a signal back to the hub in the Q stage. This then causes the counter to increment two cycles later in the P-pipeline stage. The M stage is used to map the port state to the associated channels, as its own channels that the hub prioritizes in the P-pipeline stage.

Thus, the counter has two increment inputs (one from the Q-pipeline stage and one from the C-pipeline stage. It also has a decrement input from the P-pipeline stage, and must be capable of the following incremental changes: −1, +1 and +2.

At the port end, the counter itself is simpler. This counter gets incremented when it receives a command indicating that the number of used entries has increased (i.e. a non-zero value means there is something there for the port to process), and decremented when the port processes an entry, indicating that the number of used entries has decreased. It is changed only by +1 or −1. When it decrements, a signal is sent to the hub, which arrives in Q-pipeline stage.

BRIEF DESCRIPTION OF THE DRAWINGS

These and other aspects of this invention are illustrated in the drawings, in which.

DETAILED DESCRIPTION OF PREFERRED EMBODIMENTS

The request queue manager function is a crucial part of the centralized transfer controller with hub and ports architecture. To understand its various performance aspects it is helpful to consider first the transfer controller as a whole.

Figure 1:
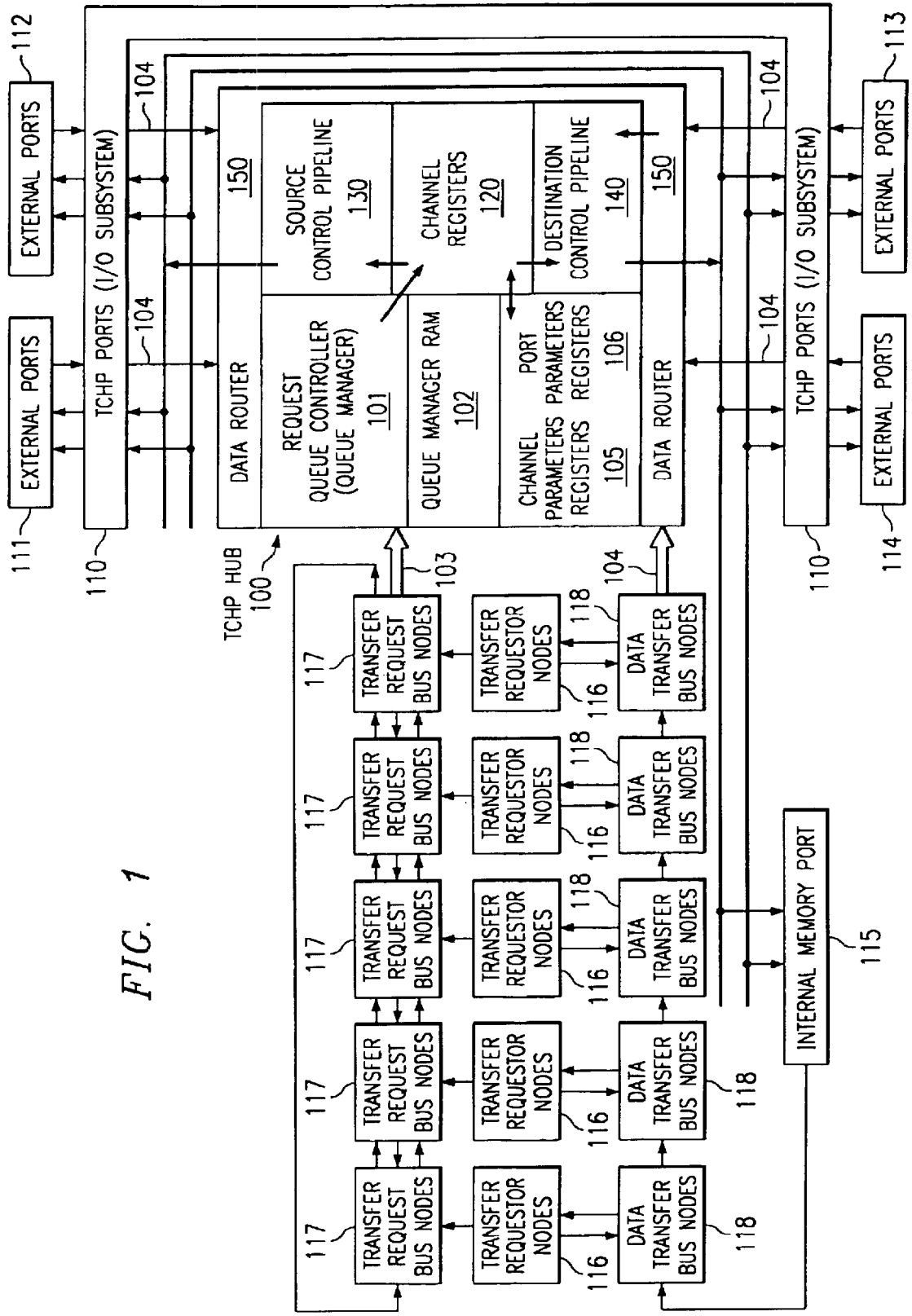
FIG. 1 illustrates in a functional block diagram the basic principal features of the transfer controller with hub and ports architecture and related functions.

The transfer controller with hub and ports transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115. At the heart of the hub is the transfer controller with hub and ports request queue controller 101 which acts upon request and status information to direct the overall actions of the transfer controller.

The transfer controller with hub and ports functions in conjunction with a transfer request bus having a set of nodes 117, which bring in transfer request packets at input 103. These transfer request bus nodes individually receive transfer requests packets from transfer requesters 116 which are processor-memory nodes or other on-chip functions which send and receive data.

Secondly, the transfer controller uses an additional bus, the data transfer bus having a set of nodes 118, to read or write the actual data at the requester nodes 116. The data transfer bus carries commands, write data and read data from a special internal memory port 115 and returns read data to the transfer controller hub via the data router 150 at inputs 104.

The transfer controller has, at its front-end portion, a request queue manager 101 receiving transfer requests in the form of transfer request packets at its input 103. Request queue manager 101 prioritizes, stores and dispatches these as required.

Request queue manager 101 connects within the transfer controller hub unit 100 to the channel request registers 120 which receive the data transfer request packets and process them. In this process, request queue manager 101 first prioritizes the transfer request packets and assigns them to one of the N channel request registers 120. Each of the N channel request registers 120 represents a priority level.

If there is no channel available for direct processing of the transfer request packet, it is stored in the queue manager memory 102. Queue manager memory 102 is preferably a random access memory (RAM). The transfer request packet is then assigned at a later time when a channel becomes available. The channel registers interface with the source 130 and destination 140 control pipelines which effectively are address calculation units for source (read) and destination (write) operations.

Outputs from these pipelines are broadcast to M ports through the transfer controller ports I/O subsystem 110. I/O subsystem 110 includes a set of hub interface units, which drive the M possible external ports units. Four such external ports are shown in FIG. 1 as external ports 111 through 114. The external ports units (also referred to as application units) are clocked either at the main processor clock frequency or at a different external device clock frequency. The external device clock frequency may be lower than or higher than the main processor clock frequency. If a port operates at its own frequency, synchronization to the core clock is required.

As an example of read-write operations at the ports, consider a read from external port node 112 followed by a write to external port node 114. First the source pipeline addresses port 112 for a read. The data is returned to the transfer controller hub through the data router unit 150. On a later cycle the destination control pipeline addresses port 114 and writes the data at port 114. External ports as described here do not initiate transfer requests but merely participate in reads and writes requested elsewhere on the chip. Read and write operations involving the processor-memory (transfer requesters) nodes 116 are initiated as transfer request packets on the transfer request bus 117. The queue manager 101 processes these as described above. On a later cycle a source pipeline output (read command/address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150. On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

This invention in its broadest sense is a method of tracking the state of a first-in-first-our (FIFO) memory which is remote, or in a different clock domain, or both. In the prior art this has been done is as follows. A FIFO has an output signal that indicates when it has passed some threshold in terms of fullness, and this is used to prevent the FIFO overflowing. The longer it takes for the hardware using this threshold signal to respond to it, the further away from full this threshold signal needs to activate. For example, if it takes ten cycles from when the threshold signal activates until new entries for the FIFO stop arriving, then the threshold signal must be asserted when there are at least ten unused entries in the FIFO. Any fewer than this and there is a risk of the FIFO overflowing.

In the context of the transfer controller, this would work as follows. Suppose there is no local queue counter in the hub, but a full flag from the port is used to indicate whether it's okay to send more commands to that port or not. The command queue in the port issues a full flag when it has N or fewer unused entries. Because of the latency between pipeline stages (described below), new commands for the command queue can be arriving for up to five cycles after the full flag. So, N would need to be at least five. This means the command queue in the port would need to be at least six entries deep. Otherwise you could never put any data in it.

There are two disadvantages with this approach. First, it requires the command queue to be at least six entries deep. In fact many ports connected to the transfer controller should have command queues of fewer entries than this. This is particularly true of low bandwidth ports. So, requiring a minimum of six entries is a large overhead. In general, if the FIFO is large with respect to N, this is not such a problem, because as a percentage of total FIFO size the overhead is small. But where the preferred FIFO depth is small in comparison to N this is an issue. For the transfer controller, slow ports such as serial ports probably only require one queue entry. Even very high-speed ports only require five or six entries to maintain full bandwidth throughput. These would need to be ten or eleven entries with the prior art scheme. Secondly, there is a question of efficiency. If the FIFO issues a full flag N entries from full, the FIFO will only fill up if whatever is sending data to the FIFO does so on every single cycle. In the transfer controller case, the hub has a choice of which ports to service. Thus the hub may not send multiple contiguous commands to the same port. This means that the N extra command queue entries required by the prior art would not always be used up.

In summary, this scheme replaces the N overhead entries in the FIFO with a local FIFO state counter at the source of the FIFO data. For larger FIFOs the overhead may not be an issue and the prior art technique may be preferable due to its simplicity. However for small FIFO schemes, this invention results in a more efficient implementation in terms of number of gates.

The present invention provides an efficient means for utilizing a counter to maintain the queue count value at a remote location on the output end of a multi-stage pipeline. The preferred embodiment in this application is a transfer controller device with hub and ports architecture.

Figure 2:
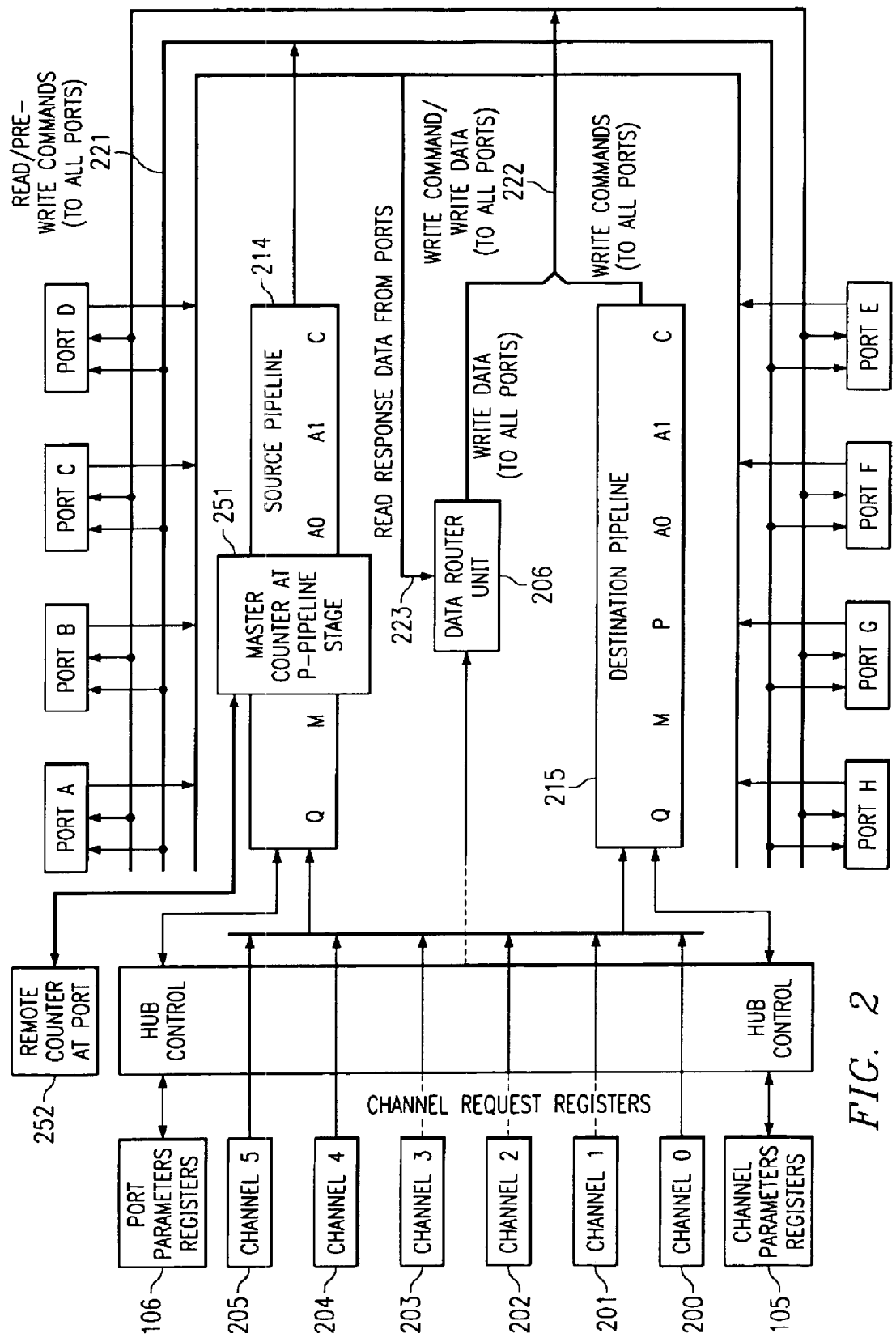
FIG. 2 illustrates the channel registers interfacing to the transfer controller hub pipelines and the hub pipelines interface to the external ports.

FIG. 2 illustrates the interface to the transfer controller hub unit boundary and particularly channel request registers 200 to 205, channel parameter registers 105 and port parameter registers 106. The channel parameters registers 105 and port parameters registers 106 store critical data regarding for example, types of transfers, mode information, status, and much other information critical to the transfer process.

The channel request registers pass information used in the source pipeline 214 for generation of the read/pre-write commands 221. Similarly the channel request registers pass information used in the destination pipeline 215 for the generation of write command/write data words 222. Read response data 223 from the ports is returned to the destination pipeline via the data router unit 206.

FIG. 2 also illustrates the possible pipelines in a transfer controller implementation. In specific implementations, one or more stages may be combined but the tasks which must be completed within the individual pipeline stages are essentially as follows.

TABLE 1

| Pipeline Stage | Function |
| --- | --- |
| Q | Interrogates the state of the queues within the ports |
| M | Map port ready signals to channels |
| P | Prioritize highest priority channel whose ports are ready |
| A0 | First half of address update cycle |
| A1 | Second half of address update cycle |
| C | Issue command to ports |

The transfer controller hub 100 requires its own set of counters in order to fully utilize the queues, rather than waiting multiple cycles determined by difference between port ready and address/write counter updates. The master counter 251 resides at the initial stage of a pipeline of six stages or more. The remote queue counter 252 is located at the output end of the pipeline. The M stage of the pipelines use the current queue counter values and generate a new one based on which port and what type of operation was selected in the P stage. The queue counter increment signal from the Q stage (registered there from the port), as well as increments from the A stages if they resulted in an annulled operation are taken into account. These counters are updated every cycle and are registered, in straightforward fashion, every cycle inside the port parameters registers.

When signals are sent from the C-pipeline final stage in the hub to the ports location a whole clock cycle is allowed. Similarly a whole clock cycle is allowed when signals are sent from the port to the hub initial Q-pipeline stage. Typically such a pipeline has a depth of about six stages.

Figure 3:
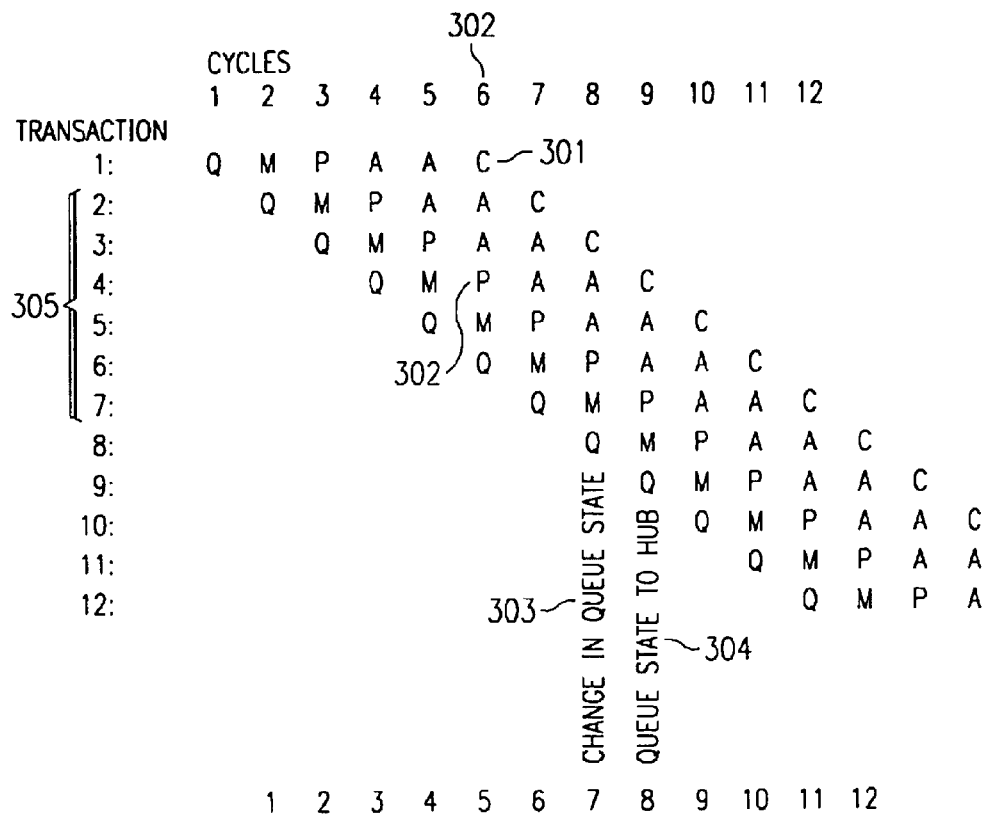
FIG. 3 illustrates an example transaction pipeline diagram.

A transaction pipeline diagram in FIG. 3 illustrates the behavior. In FIG. 3 each cycle is represented by a column and each transaction by a row. The first transaction sends a command 301 in cycle 6, and the resulting change in the value of the queue state 303 will occur in cycle 7, and be communicated back to the hub 304 in cycle 8. Thus transactions 2 through 7 inclusive denoted 305 would have to assume the value of the queue state counter was invalid, and would not be able to initiate transactions to that port. An improvement would be to send a 'pre-command' to the port in A0-pipeline stage indicating that a transaction was about to be sent. This would improve things by two cycles. But this would also require the addition of an annulment signal in the C-pipeline stage, to cancel the pre-command in the event that it is annulled.

The preferred solution to this is the subject of this patent application. The state of the command queue is maintained independently by both the hub and the port.

Figure 4:
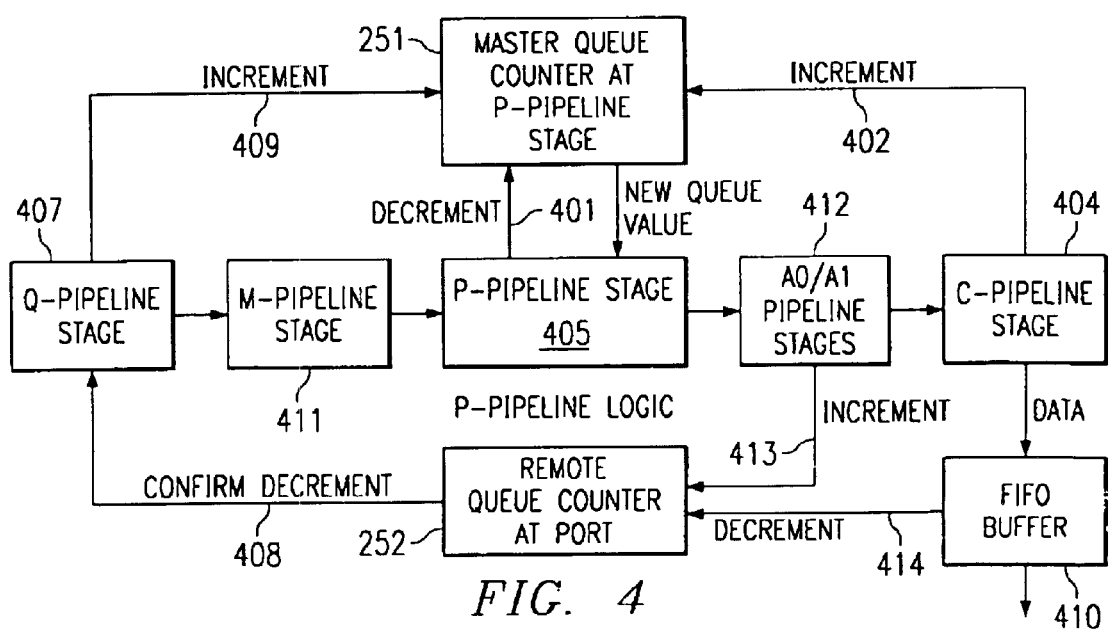
FIG. 4 illustrates, in block diagram form, the use of two counters to maintain a valid queue at a remote location.

FIG. 4 illustrates the use of two counters to maintain a valid queue at a remote location. The hub maintains its counter in the P-pipeline stage as master queue counter 251. Master queue counter 251 indicates the number of available entries in the queue of the subject port. Master queue counter 251 is initialized at the number of stages in FIFO buffer 410. A non-zero value indicates that the port can accept another command. It can be adjusted in several ways:

Having decided to send a transaction to the port referenced in the P-pipeline stage, 405 transfer controller hub 100 sends a decrement signal 401 to the state of master queue counter 251 making ready for the next cycle. This decreases the stored number of available entries in FIFO buffer 410 upon allocation of new data to the port. In this example it is the P-pipeline stage of the next transaction represented by P-pipeline logic 405. This allows multiple transactions to be sent to the same port on consecutive cycles.

The process must make an adjustment if the transaction is annulled. An annulment will cause transfer controller hub 100 to send an increment signal 402 to the master queue counter 251 because the entry earmarked for this transaction has not been used. So, for example, if the first transaction is annulled, this will generate a signal which will cause master queue counter 251 to be incremented in the P stage of transaction 4 or during clock 6 (see 303 of FIG. 3). Annulling the transaction means that the entry within FIFO buffer 410 is no longer allocated and can be reused.

When the port has processed an entry from its queue FIFO buffer 410, it sends a decrement signal 414 to remote queue counter 252 within the port logic. The port logic also sends a confirm decrement signal 408 back to transfer controller hub 100 in the Q-pipeline stage 407. This then sends an increment signal 409 to the master queue counter 251 two cycles later in the P-pipeline stage. The M-pipeline stage 411 is used to map the port state to the associated channels, as it owns the channels that transfer controller hub 100 prioritizes in the P-pipeline stage 405. Thus an emptying of an entry from FIFO buffer 410 means that another entry is available for use.

Thus, master queue counter 251 has two increment inputs signals, one increment signal 409 from the Q-pipeline stage 407 and one increment signal 402 from the C-pipeline stage 404. Master queue counter 251 also may receive a decrement signal 401 from the P-pipeline stage 405. Master queue counter 251 thus must be capable of making the following incremental changes: −1, +1 and +2.

At the port end, remote queue counter 251 is simpler. The count in remote queue counter 251 is the number of entries stored in FIFO buffer 410. A non-zero value means FIFO buffer 410 stores data for the port to process. Remote queue counter 252 is initialized at zero. Remote queue counter 252 receives increment signal 413 from A0/A1-pipeline stages 412 when it receives a command indicating that the number of used entries has increased. Note that the actual data arrives one cycle later from C-pipeline stage 404. Remote queue counter 252 receives a decrement signal 414 when FIFO buffer 410 outputs an entry to the port, indicating that the number of entries within FIFO buffer 410 has decreased. Thus remote queue counter 252 need only change by +1 or −1. When remote queue counter 252 decrements, it sends a confirm decrement signal 408 to the hub at Q-pipeline stage 407.

Using the system of this invention, the transfer controller hub 100 consults the state of master queue counter 251 to determine if there is space to transmit more data to the port. Master queue counter 251 may indicate less space is available than actually the case because the latency in receiving the confirm decrement signal 408 and increment signal 409. However, master queue counter 251 never indicates more space than actually available. Master queue counter 251 decrements upon allocation of data to the port, before it reaches the port. Master queue counter 251 increments upon confirmation of a decrement at remote queue counter 252. Thus the transfer controller hub 100 may rely on master queue counter 251 to make decisions whether to transmit additional data from hub transfer controller 100 to the port. When operating dynamically master queue counter 251 and remote queue counter 252 may have differing indications. For example, master queue counter 251 may indicate no space within FIFO buffer 404 when in fact that last entry has been read but the confirm decrement signal 408 has not caused an increment signal 409 due to transmission latency. However, these counters will tend synchronize for any interval when transfer controller hub 100 is not sending new data. As a result of this two counter technique transfer controller hub 100 never overruns FIFO buffer 410. On the other hand, this two counter technique makes better use of the available bandwidth than the prior art technique. In particular, this technique does not require a first-in-first-out buffer depth equal the to the data transfer latency. This technique is particularly useful in systems with delays between the data source and data destination and a mismatch of maximum data transfer rates.

What is claimed is:

1. A data transfer apparatus transferring data from a data source to a data destination comprising:

a first-in-first-out buffer memory having an input connected to the data source, an output connected to said data destination and a predetermined number of data entries;

a master queue counter storing a master count indicative of a number of data entries available for data storage within said first-in-first-out buffer memory, said master queue counter connected to the data source to decrement said master count upon allocation of data at said data source to be stored in said first-in-first-out buffer memory;

a remote queue counter storing a remote count indicative of a number of data entries within said first-in-first-out buffer memory currently storing data, said remote queue counter connected to said data source for incrementing said remote count upon allocation of data at said data source to be stored in said first-in-first-out buffer memory, said remote queue counter connected to said data destination for decrementing said remote count and, generating a decrement confirmation signal upon transfer of data out of said first-in-first-out buffer memory to said data destination;

wherein said master queue counter is further connected to said remote queue counter for incrementing said master count upon receipt of said decrement confirmation signal;

said data source ma allocate data to said first-in-first-out buffer memory only if said master queue counter indicates a non-zero number of data entries available for data storage within said first-in-first-out buffer memory; and said data destination reads said first-in-first-out buffer memory only if said remote queue counter is non-zero.

2. The data transfer apparatus of claim 1, wherein:

said master queue counter is initialized to said predetermined number of data entries of said first-in-first-out buffer memory; and said remote queue counter is initialized at zero.

3. A data transfer apparatus transferring data from a data source to a data destination comprising:

a first-in first-out buffer memory having an input connected to the data source, an output connected to said data destination and a predetermined number of data entries;

a master queue counter storing a master count indicative of a number of data entries available for data storage within said first-in-first-out buffer memory, said master queue counter connected to the data source to decrement said master count allocation of data at said data source to be stored in said first-in-first-out buffer memory;

a remote queue counter storing a remote count indicative of a number of data entries within said first-in-first-out buffer memory currently data, said remote queue counter connected to said data source for incrementing said remote count upon allocation of data at said data source to be stored in said first-in-first-out buffer memory, said remote queue counter connected to said data destination for decrementing said remote count and generating a decrement confirmation signal transfer of data out of said first-in-first-out buffer memory to said data destination;

wherein said master queue counter is further connected to said remote, queue counter for incrementing said master count upon receipt of said decrement confirmation signal;

said data source may selectively annul allocation of data of said data source to be stored in said first-in-first-out buffer memory for data allocated but whose transmission is annulled, said data source generating an annul increment signal upon annulling data; and said master queue counter is further connected to said data source to increment said master count upon receipt of said annul increment signal.

4. The data transfer apparatus of claim 3, wherein:

said master queue counter is initialized to said predetermined number of data entries of said first-in-first-out buffer memory; and said remote queue counter is initialized at zero.

5. A method of transferring data from a data source to a data destination comprising the steps of:

maintaining a master count indicative of a number of data entries available for data storage within a first-in-first-out buffer memory;

allocating data from the data source to the first-in-first-out buffer memory only when the master count is non-zero;

decrementing the master count upon allocation of data at the data source to be stored in the first-in-first-out buffer memory;

maintaining a remote count indicative of a number of data entries within the first-in-first-out buffer memory currently storing data;

incrementing the remote count upon allocation of data at said data source to be stored in said first-in-first-out buffer memory;

transferring data from the first-in-first-out buffer memory to the data destination only if the remote count is non-zero;

decrementing the remote count upon transfer of data out of the first-in-first-out buffer memory to the data destination;

incrementing the master count upon confirmation of decrementing of the remote count.

6. The method of transferring data of claim 5, further comprising the steps of:

initializing the master count to the number of data entries of the first-in-first-out buffer memory; and initializing the remote count to zero.

7. The method of transferring data of claim 5, wherein:

selectively annulling allocation of data of the data source to be stored in the first-in-first-out buffer memory for data allocated but whose transmission is annulled; and incrementing the master count upon annulling allocation of data.

8. A data transfer apparatus transferring data from a data source to a data destination in a plurality of pipeline stages comprising:

a first-in-first-out buffer memory having an input connected to the data source, an output connected to said data destination and a predetermined number of data entries;

a master queue counter storing a master count indicative of a number of data entries available for data storage within said first-in-first-out buffer memory, said master queue counter connected to the data source to decrement said master count upon allocation of data at said data source to be stored in said first-in-first-out buffer memory during a first pipeline stage;

a remote queue counter storing a remote count indicative of a number of data entries within said first-in-first-out buffer memory currently storing data, said remote queue counter connected to said data source for incrementing said remote count upon allocation of data at said data source to be stored in said first-in-first-out buffer memory during a second pipeline stage after said first pipeline stage, said remote queue counter connected to said data destination for decrementing said remote count and generating a decrement confirmation signal upon transfer of data out of said first-in-first-out buffer memory to said data destination during a third pipeline stage after said second pipeline stage; and wherein said master queue counter is further connected to said remote queue counter for incrementing said master count upon receipt of said decrement confirmation signal during a fourth pipeline stage after said third pipeline stage.

9. The data transfer apparatus of claim 8, wherein:

said master queue counter is initialized to said predetermined number of data entries of said first-in-first-out buffer memory; and said remote queue counter is initialized at zero.

10. The data transfer apparatus of claim 8, wherein:

said data source may allocate data to said first-in-first-out buffer memory during said first pipeline stage only if said master queue counter indicates a non-zero number of data entries available for data storage within said first-in-first-out buffer memory; and said data destination reads said first-in-first-out buffer memory during said third pipeline stage only if said remote queue counter is non-zero.

11. The data transfer apparatus of claim 8, wherein:

said data source may selectively annul allocation of data of said data source to be stored in said first-in-first-out buffer memory during a fourth pipeline stage after said first pipeline stage and before said second pipeline stage, said data source generating an annul increment signal upon annulling data; and said master queue counter is further connected to said data source to increment said master count upon receipt of said annul increment signal during a fifth pipeline stage after said fourth pipeline stage.

* * * * *